US012345072B2

(12) United States Patent
Itoh et al.

(10) Patent No.: US 12,345,072 B2
(45) Date of Patent: Jul. 1, 2025

(54) PARKING FACILITY AND PARKING SYSTEM

(71) Applicant: TOYOTA JIDOSHA KABUSHIKI KAISHA, Aichi-ken (JP)

(72) Inventors: Masayuki Itoh, Nagoya (JP); Iwao Maeda, Nagoya (JP); Tatsuya Sugano, Susono (JP); Norinao Watanabe, Susono (JP); Yutaka Nakamura, Susono (JP); Yoshikazu Jikuhara, Susono (JP); Yuki Nishikawa, Susono (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 221 days.

(21) Appl. No.: 18/185,392

(22) Filed: Mar. 17, 2023

(65) Prior Publication Data

US 2023/0374808 A1 Nov. 23, 2023

(30) Foreign Application Priority Data

May 19, 2022 (JP) ................................ 2022-082255

(51) Int. Cl.
*E04H 6/36* (2006.01)
*B66F 9/06* (2006.01)

(52) U.S. Cl.
CPC ............... *E04H 6/36* (2013.01); *B66F 9/063* (2013.01)

(58) Field of Classification Search
CPC .. E04H 6/36; E04H 6/42; B66F 9/063; G08G 1/149
See application file for complete search history.

(56) References Cited

U.S. PATENT DOCUMENTS

| | | | | | |
|---|---|---|---|---|---|
| 3,990,589 | A * | 11/1976 | Manaugh | E04H 6/42 | 414/255 |
| 4,337,013 | A * | 6/1982 | Buttironi | E04H 6/36 | 104/48 |
| 2018/0142488 | A1* | 5/2018 | Boussard | E04H 6/36 | |
| 2019/0197636 | A1* | 6/2019 | Mukundala | G06Q 50/12 | |
| 2020/0111361 | A1* | 4/2020 | Witten | G06V 20/62 | |
| 2020/0180696 | A1* | 6/2020 | Tzivanopoulos | E04H 6/34 | |
| 2021/0357821 | A1* | 11/2021 | Graef | G07F 17/24 | |
| 2023/0119390 | A1* | 4/2023 | Takakuwa | G05D 1/0011 | 701/2 |

FOREIGN PATENT DOCUMENTS

| | | | |
|---|---|---|---|
| JP | 2006316421 | A * | 11/2006 |
| JP | 2019-78099 | A | 5/2019 |
| JP | 2021139239 | A * | 9/2021 |

* cited by examiner

*Primary Examiner* — Kaitlin S Joerger
(74) *Attorney, Agent, or Firm* — HAUPTMAN HAM, LLP

(57) ABSTRACT

A parking facility is suitable for carrying a vehicle into a parking stall or carrying the vehicle out of the parking stall by a transport vehicle that enters a lower space under the vehicle and picks up the vehicle. The parking facility includes a restricting member that can move between a restricting position in which entry of the transport vehicle into the parking stall for carrying the vehicle into the parking stall or carrying the vehicle out of the parking stall is restricted and an allowable position in which the entry of the transport vehicle into the parking stall for carrying the vehicle into the parking stall or carrying the vehicle out of the parking stall is allowed.

13 Claims, 8 Drawing Sheets

PARKING FACILITY AND PARKING SYSTEM

CROSS-REFERENCE TO RELATED APPLICATION

This application claims priority to Japanese Patent Application No. 2022-082255 filed on May 19, 2022, incorporated herein by reference in its entirety.

BACKGROUND

1. Technical Field

The present disclosure relates to a parking facility and a parking system.

2. Description of Related Art

A lift transport carrier is known that enters a space under a vehicle and picks up the vehicle (see, for example, Japanese Unexamined Patent Application Publication No. 2019-078099 (JP 2019-078099 A)). In JP 2019-078099 A, first, the carrier frame of the lift transport carrier enters the space under the vehicle. Then, for each tire of the vehicle, arms of a pair of arms are moved from the carrier frame under the tire on the front and rear sides of the tire, respectively. The carrier frame is then lifted so that the tire is lifted by the arms, and thus the vehicle is lifted. Subsequently, the lift transport carrier moves to transport the vehicle.

SUMMARY

It is conceivable that a parked vehicle can be easily transported by using the lift transport carrier described in JP 2019-078099 A. However, this may increase the risk of vehicle theft. In particular, in automated valet parking in which vehicles are carried into and out of parking stalls by a transport carrier, the parking facility is basically unmanned, so the risk of theft may increase. Alternatively, there is also a possibility that the transport carrier transports a vehicle that should not be transported. That is, the vehicle may be transported unintentionally in the parking facility.

According to the present disclosure, the following configurations are provided.

Configuration 1

A parking facility appropriate for carrying a vehicle into a parking stall or carrying the vehicle out of the parking stall by a transport vehicle that enters a lower space under the vehicle and picks up the vehicle, the parking facility including

- a restricting member that is able to move between a restricting position in which entry of the transport vehicle into the parking stall for carrying the vehicle into the parking stall or carrying the vehicle out of the parking stall is restricted and an allowable position in which the entry of the transport vehicle into the parking stall for carrying the vehicle into the parking stall or carrying the vehicle out of the parking stall is allowed.

Configuration 2

In the parking facility according to configuration 1, the restricting member may be positioned in the restricting position when the vehicle is parked in the parking stall, and the restricting member may be positioned in the allowable position when the transport vehicle carries the vehicle into the parking stall and when the transport vehicle carries the vehicle out of the parking stall.

Configuration 3

In the parking facility according to configuration 1 or 2, the restricting member may be positioned in the restricting position when the vehicle is not parked in the parking stall.

Configuration 4

In the parking facility according to any one of configurations 1 to 3, the restricting member may be provided in a vicinity of one end or both ends of the parking stall in a longitudinal direction.

Configuration 5

In the parking facility according to any one of configurations 1 to 4, the restricting member may protrude from a road surface in the restricting position and may be withdrawn to the road surface in the allowable position.

Configuration 6

In the parking facility according to any one of configurations 1 to 5, the restricting member may include a plurality of restricting members 41, the restricting members being provided so as to be offset from each other in a longitudinal direction of the parking stall.

Configuration 7

In the parking facility according to any one of configurations 1 to 4, the restricting member may be close to a vehicle parked in the parking stall in the restricting position and the restricting member may be away from the vehicle parked in the parking stall in the allowable position.

Configuration 8

In the parking facility according to any one of configurations 1 to 7, in the restricting position, the restricting member may allow the vehicle to move into the parking stall or move out of the parking stall by self-propulsion.

Configuration 9

In the parking facility according to any one of configurations 1 to 8, the transport vehicle may be an autonomous driving vehicle.

Configuration 10

A parking system appropriate for carrying a vehicle into a parking stall or carrying the vehicle out of the parking stall by a transport vehicle that enters a lower space under the vehicle and picks up the vehicle, the parking system including:

- a restricting member that is able to move between a restricting position in which entry of the transport vehicle into the parking stall for carrying the vehicle into the parking stall or carrying the vehicle out of the parking stall is restricted and an allowable position in which the entry of the transport vehicle into the parking stall for carrying the vehicle into the parking stall or carrying the vehicle out of the parking stall is allowed; and
- a management server configured to control the restricting member such that the restricting member is positioned in the restricting position when the vehicle is parked in the parking stall, and the restricting member is positioned in the allowable position when the transport vehicle carries the vehicle into the parking stall and when the transport vehicle carries the vehicle out of the parking stall.

Unintentional transportation of the vehicle can be restricted.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
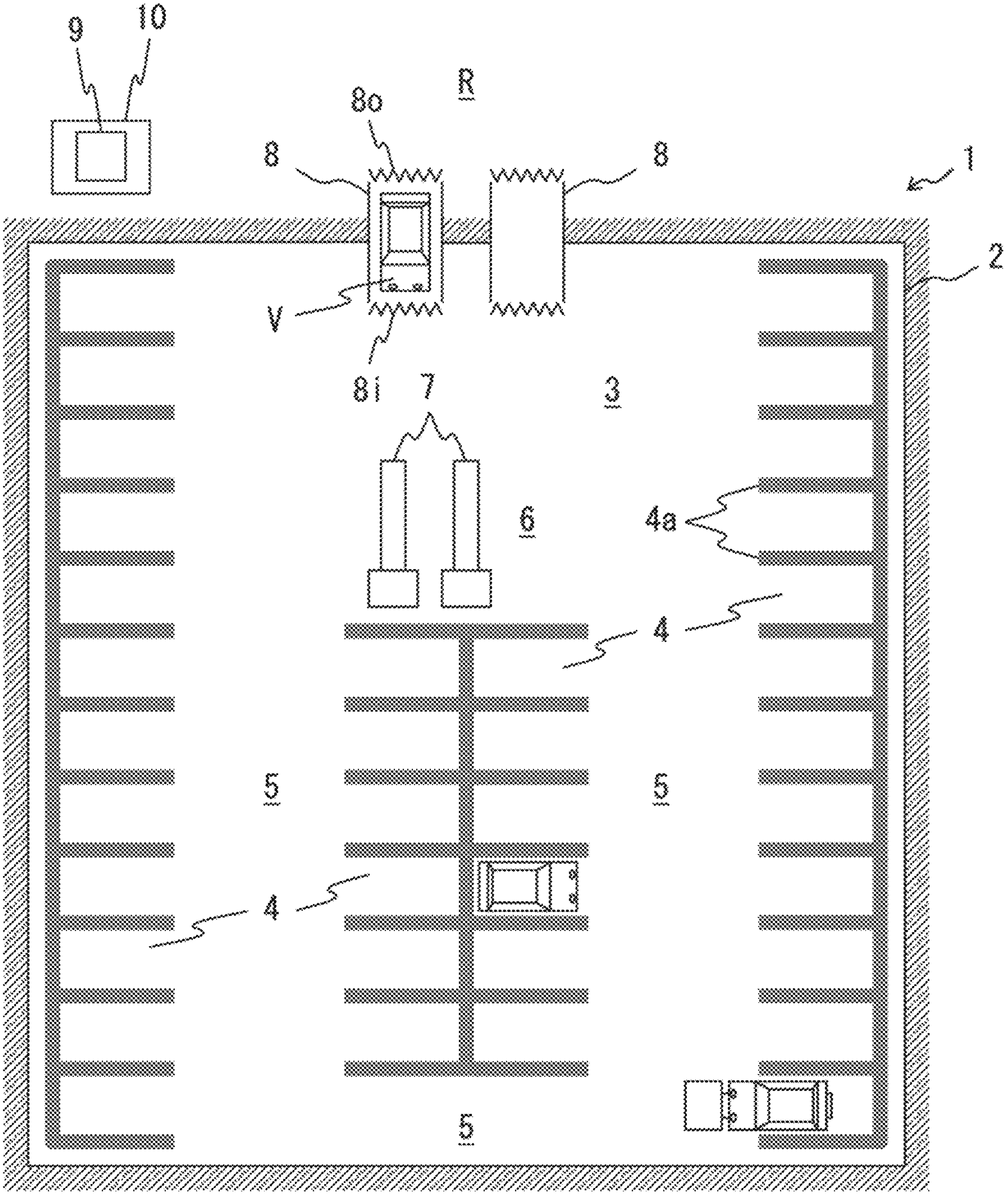
FIG. 1 is a schematic overall view of a parking facility of an embodiment according to the present disclosure.

FIG. 1 schematically shows a parking facility 1 of an embodiment according to the present disclosure. With reference to FIG. 1, the parking facility 1 of the embodiment according to the present disclosure includes a parking area 3 enclosed by, for example, a fence 2. The parking area 3 includes at least one parking stall 4, at least one passage 5 connected to the parking stall 4, and a transport vehicle standby area 6.

Each parking stall 4 is demarcated as an area for parking approximately one vehicle by lines 4*a* painted on a road surface, for example. The transport vehicle standby area 6 is an area for at least one transport vehicle or transport robot 7 to wait. The transport vehicle 7 transports a vehicle V in the parking area 3 by autonomous driving.

The parking area 3 is connected to, for example, a road R outside the parking facility 1 via at least one boarding and alighting place 8. In the example shown in FIG. 1, two boarding and alighting places 8 are provided. The boarding and alighting place 8 includes an inner gate 8*i* on the parking area 3 side and an outer gate 8*o* on the road R side.

A management facility 10 is provided, for example, outside the parking facility 1, and a management server 9 is installed in the management facility 10.

The parking facility 1 of the embodiment according to the present disclosure is suitable for providing an automated valet parking service. The automated valet parking service will be briefly described below with reference to FIG. 1. That is, in the embodiment according to the present disclosure, when the vehicle V approaches the boarding and alighting place 8 from the road R, the outer gate 8*o* of the boarding and alighting place 8 opens, and the vehicle V enters the boarding and alighting place 8 via the outer gate 8*o* and stops. The occupant or the user then gets off the vehicle V and exits the boarding and alighting place 8, and subsequently transmits an entering instruction through the user's mobile terminal, for example. When the management server 9 receives the entering instruction, the outer gate 8*o* is closed and the inner gate 8*i* is opened in accordance with the instruction from the management server 9. Then, in accordance with the instruction from the management server 9, the transport vehicle 7 carries the vehicle V into the parking stall 4 determined by the management server 9. In one example, the transport vehicle 7 first moves to the boarding and alighting place 8 and picks up the vehicle V. The transport vehicle 7 then moves along the passage 5 to transport the vehicle V to the parking stall 4 determined by the management server 9, and drops off the vehicle V. Accordingly, the vehicle V is carried into the parking stall 4 and enters the parking facility 1.

On the other hand, when the vehicle V should leave the parking facility 1, the user transmits a leaving instruction from the mobile terminal. When the management server 9 receives the leaving instruction, the transport vehicle 7 carries the vehicle V out of the parking stall 4 in accordance with the instruction from the management server 9. In one example, the transport vehicle 7 moves to the corresponding parking stall 4 and picks up the vehicle V. Then, the transport vehicle 7 moves along the passage 5 to transport the vehicle V to the boarding and alighting place 8 where the inner gate 8*i* is opened, and drops off the vehicle V. Next, in accordance with the instruction from the management server 9, the inner gate 8*i* is closed and the outer gate 8*o* is opened. Subsequently, when the user gets into the vehicle V and the vehicle V exits from the boarding and alighting place 8 onto the road R, the outer gate 8*o* is closed. Accordingly, the vehicle V is carried out of the parking stall 4 and leaves the parking facility 1. It should be noted that the transport vehicle 7 that has dropped off the vehicle V in the parking stall 4 or the boarding and alighting place 8 then either returns to the transport vehicle standby area 6 or moves on to another parking stall 4 or another boarding and alighting place 8 to pick up another vehicle V.

In another embodiment applied when the vehicle V is an autonomous driving vehicle, the vehicle V receives the entering instruction from the management server 9 and is self-propelled to the parking stall 4 determined by the management server 9. Upon receipt of the leaving instruction from the management server 9, the vehicle V is self-propelled from the parking stall 4 to the boarding and alighting place 8.

Figure 2:
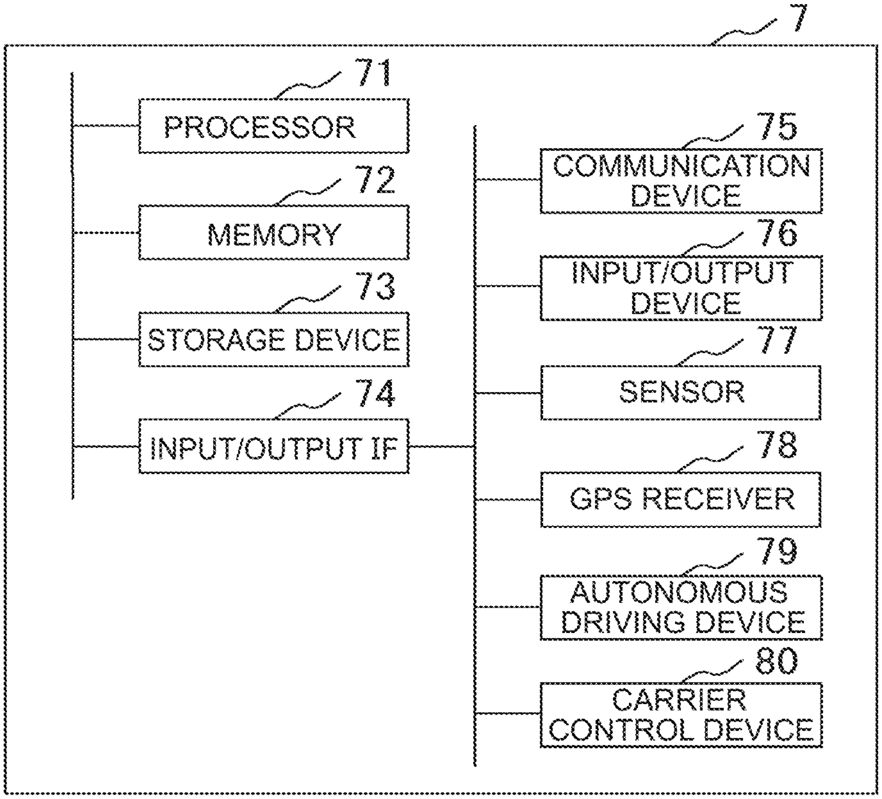
FIG. 2 is a schematic diagram of a transport vehicle of the embodiment according to the present disclosure.

The transport vehicle 7 of the embodiment according to the present disclosure includes, as shown in FIG. 2 schematically, one or more processors 71, one or more memories 72, a storage device 73, and an input/output interface (IF) 74 that are connected so as to be able to communicate with each other through a bidirectional bus. The memory 72 includes a volatile or a non-volatile memory. Various programs are stored in the memory 72, and these programs are executed by the processor 71. The storage device 73 stores data of a map of the parking area 3 (for example, the layout of the parking stalls 4, etc.), calculation models, and the like. A communication device 75, an input/output device 76, one or more sensors 77, a Global Positioning System (GPS) receiver 78, an autonomous driving device 79, a carrier control device 80, and the like are connected to the input/output IF 74 so as to be able to communicate with the input/output IF 74.

The communication device 75 is connected to a communication network, such as the Internet, so as to be able to communicate with the communication network. The input/output device 76 includes, for example, a keyboard, a mouse, a media reader/writer, an in-vehicle display, and the like. The sensor 77 includes a camera, a light detection and ranging (LiDAR), and the like for autonomous driving. The GPS receiver 78 receives signals from GPS satellites and thereby detects information representing the absolute position (for example, the longitude and latitude) of the transport vehicle 7. The autonomous driving device 79 includes actuators that each execute driving, steering, and braking of the transport vehicle 7. The carrier control device 80 will be described later.

Figure 3:
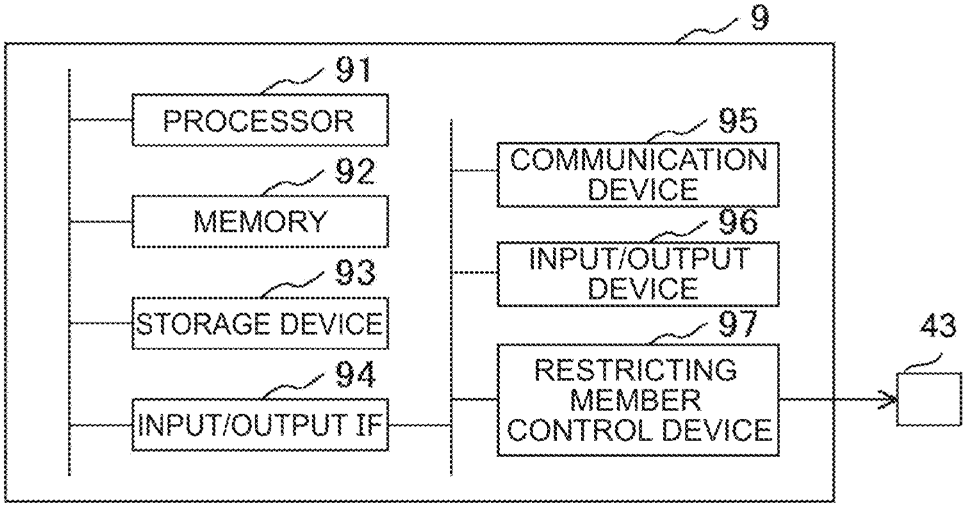
FIG. 3 is a schematic diagram of a management server of the embodiment according to the present disclosure.

On the other hand, the management server 9 of the embodiment according to the present disclosure includes, as shown in FIG. 3 schematically, one or more processors 91, one or more memories 92, a storage device 93, and an input/output interface (IF) 94 that are connected so as to be able to communicate with each other through a bidirectional bus. The memory 92 includes a volatile or a non-volatile memory. Various programs are stored in the memory 92, and these programs are executed by the processor 91. The storage device 93 stores data of a map of the parking area 3 (for example, the layout of the parking stalls 4, etc.), calculation models, and the like. A communication device 95, an input/output device 96, a restricting member control device 97, and the like are connected to the input/output IF 94 so as to be able to communicate with the input/output IF 94. The communication device 95 is connected to a communication network, such as the Internet, so as to be able to communicate with the communication network. The input/output device 96 includes, for example, a keyboard, a mouse, a media reader/writer, and the like. The restricting member control device 97 is connected to an actuator 43 described later so as to be able to communicate with the actuator 43.

Figure 4A:
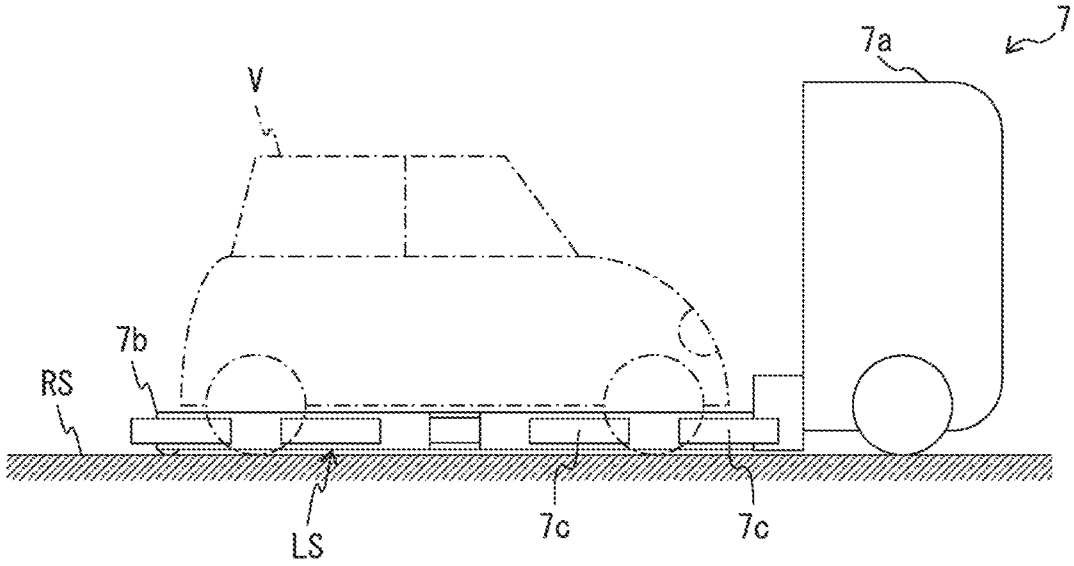
FIG. 4A is a side view of the transport vehicle of the embodiment according to the present disclosure, and is a schematic view showing a state in which a carrier is in a lowered position and the arms are in a retracted position.
Figure 4B:
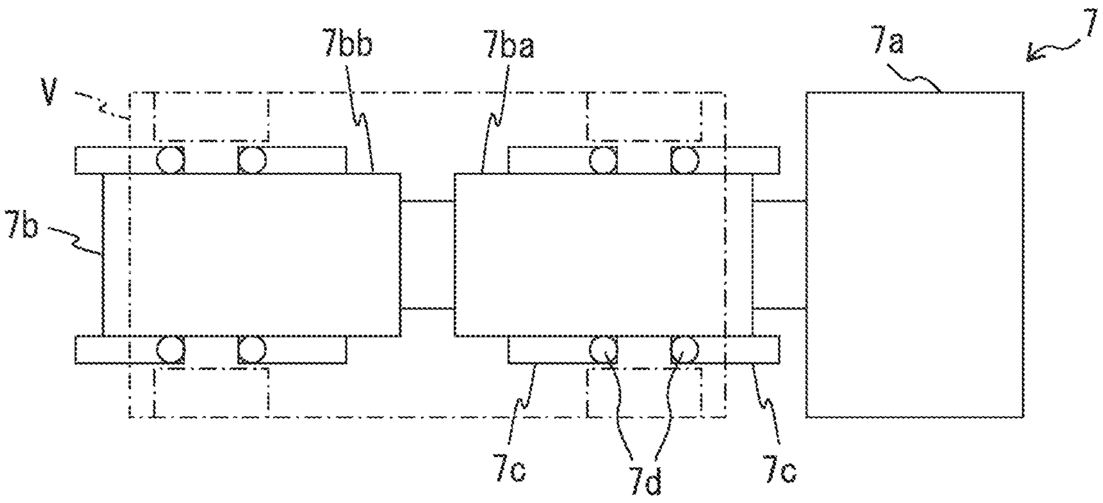
FIG. 4B is a plan view of the transport vehicle of the embodiment according to the present disclosure, and is a schematic view showing a state in which the carrier is in the lowered position and the arms are in the retracted position.
Figure 5A:
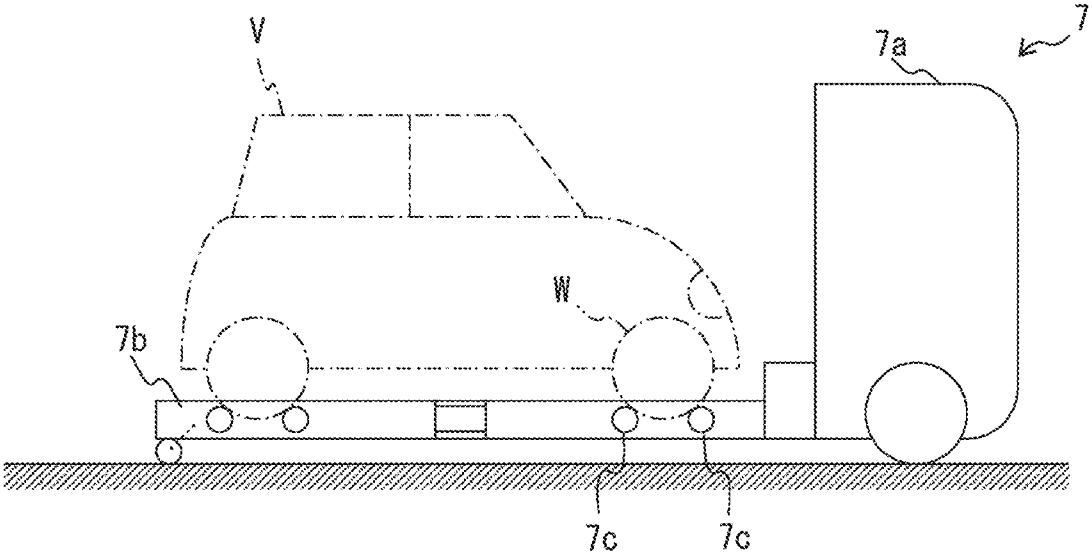
FIG. 5A is a side view of the transport vehicle of the embodiment according to the present disclosure, and is a schematic view showing a state in which the carrier is in a raised position and the arms are in a deployed position.
Figure 5B:
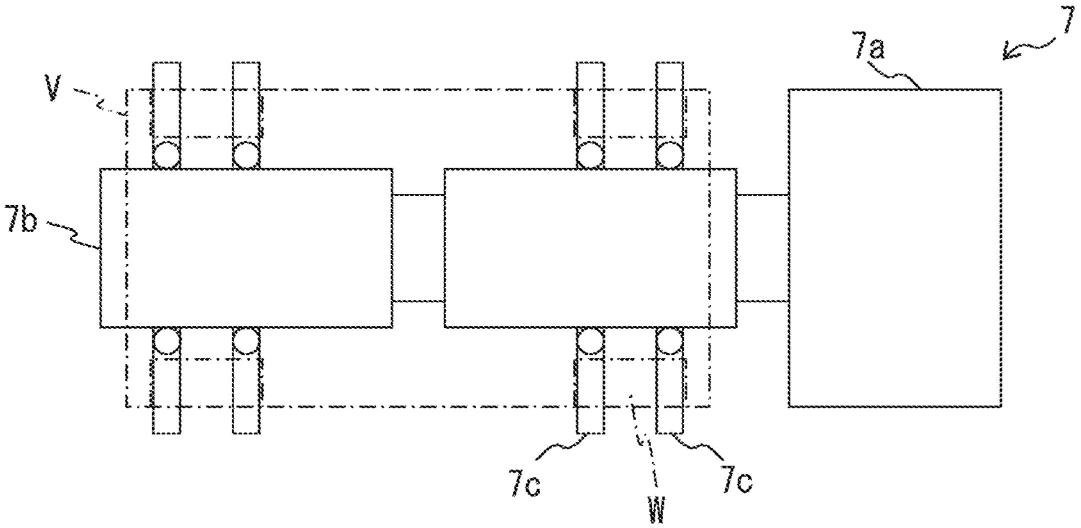
FIG. 5B is a plan view of the transport vehicle of the embodiment according to the present disclosure, and is a schematic view showing a state in which the carrier is in the raised position and the arms are in the deployed position.

FIGS. 4A and 4B, and FIGS. 5A and 5B schematically show the transport vehicle 7 of the embodiment according to the present disclosure. With reference to FIGS. 4A and 4B, and FIGS. 5A and 5B, the transport vehicle 7 includes a drive portion **7*a* and a carrier 7*b* that are aligned in the longitudinal direction and connected to each other. The drive portion 7*a* is a battery electric vehicle (BEV) provided with the autonomous driving device 79 described above. The carrier 7*b* is able to move in the vertical direction between a lowered position that is relatively low and a raised position that is relatively high, by the carrier control device 80 described above. In FIGS. 4A and 4B, the carrier 7*b* is in the lowered position. In FIGS. 5A and 5B, the carrier 7*b* is in the raised position. The carrier 7*b* includes a pair of carrier portions 7*ba*, 7*bb*, and the carrier portions are aligned in the longitudinal direction. The carrier portions 7*ba*, 7*bb* can move relatively in the longitudinal direction by the carrier control device 80 described above. A pair of arms 7*c* is attached to each side of the carrier portion 7*ba* with the arms being separated from each other in the longitudinal direction, and a pair of arms 7*c* is attached to each side of the carrier portion 7*bb* with the arms being separated from each other in the longitudinal direction. Each of the arms 7*c* can be moved around a corresponding one of the pins 7*d* between a retracted position extending in the longitudinal direction along a corresponding one of the carrier portions 7*ba*, 7*bb* and a deployed position extending in a direction orthogonal to the longitudinal direction away from the corresponding carrier portion 7*ba*, 7*bb*, by the carrier control device 80. In FIGS. 4A and 4B, the arms 7*c* are in the retracted position. On the other hand, in FIGS. 5A and 5B, the arms 7*c*** are in the deployed position.

When the transport vehicle 7 is to transport the vehicle V, the transport vehicle 7 moves to the vehicle V with the carrier **7*b* in the lowered position and the arms 7*c*, 7*c* in the retracted position. Next, as shown in FIGS. 4A and 4B, the transport vehicle 7 is moved so that the carrier 7*b* enters the lower space LS formed between the vehicle V and the road surface RS. In one example, the carrier 7*b* enters the lower space LS from one end of the lower space LS in the longitudinal direction. At this time, the position of the carrier 7*b* with respect to the vehicle V and the relative position of the carrier portions 7*ba*, 7*bb* in the longitudinal direction are controlled so that the arms 7*c* face a corresponding one of tires W. The arms 7*c* are then moved to the deployed position. As a result, the arms 7*c* are positioned under the corresponding one of the tires W on the front and rear sides of the corresponding tire W, respectively. Next, the carrier 7*b* is moved to the raised position. As a result, the vehicle V is picked up by the transport vehicle 7, as shown in FIGS. 5A and 5B. The transport vehicle 7** moves with the vehicle V being picked up, thereby transporting the vehicle V.

Next, when the transport vehicle 7 reaches a target position, the carrier **7*b* is moved to the lowered position. The arms 7*c* are then moved to the retracted position. Subsequently, the transport vehicle 7 is moved so that the carrier 7*b* is withdrawn from the lower space LS. In this way, the vehicle V is dropped off from the transport vehicle 7**.

The transport vehicle 7 or the carrier **7*b*** may enter the lower space LS from the front side of the vehicle V, or may enter the lower space LS from the rear side of the vehicle V.

FIGS. 6A, 6B, and 6C and FIGS. 7A, 7B, and 7C schematically show the parking stall 4 of the embodiment according to the present disclosure. With reference to FIGS. 6A, 6B, and 6C and FIGS. 7A, 7B, and 7C, the parking stall 4 is rectangularly demarcated, for example by three lines **4*a*, and is connected to the passage 5 at one end of the parking stall 4** in the longitudinal direction.

Figure 6A:
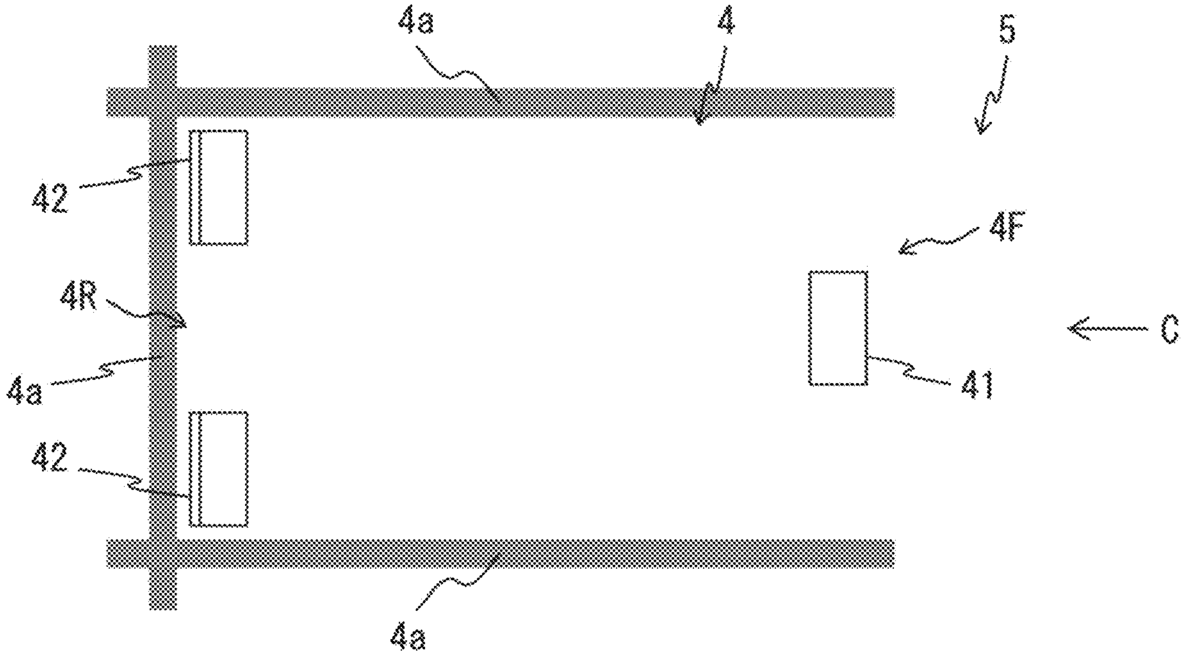
FIG. 6A is a plan view of a parking stall of the embodiment according to the present disclosure, and is a diagram showing a state in which a restricting member is in an allowable position.
Figure 6B:
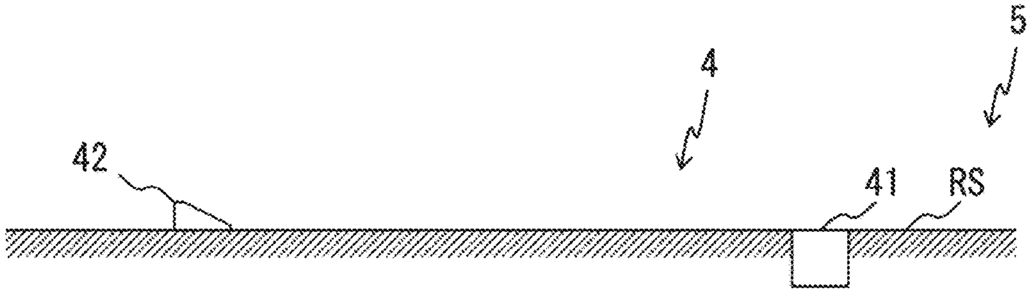
FIG. 6B is a side view of the parking stall of the embodiment according to the present disclosure, and is a diagram showing a state in which the restricting member is in the allowable position.
Figure 6C:
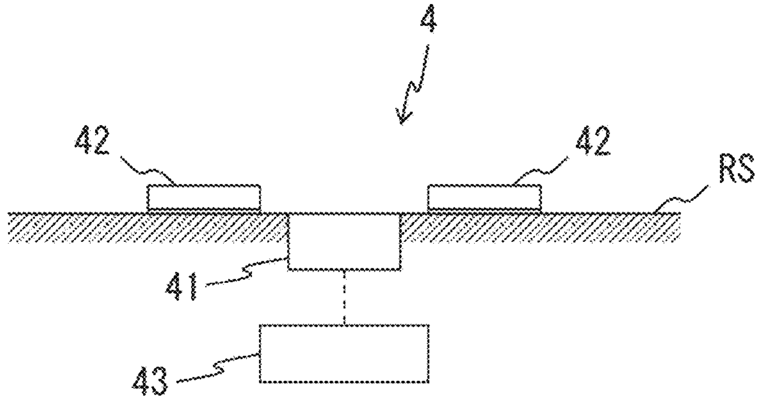
FIG. 6C is a front view of the parking stall of the embodiment according to the present disclosure viewed along an arrow C in FIG. 6A, and is a diagram showing a state in which the restricting member is in the allowable position.
Figure 7A:
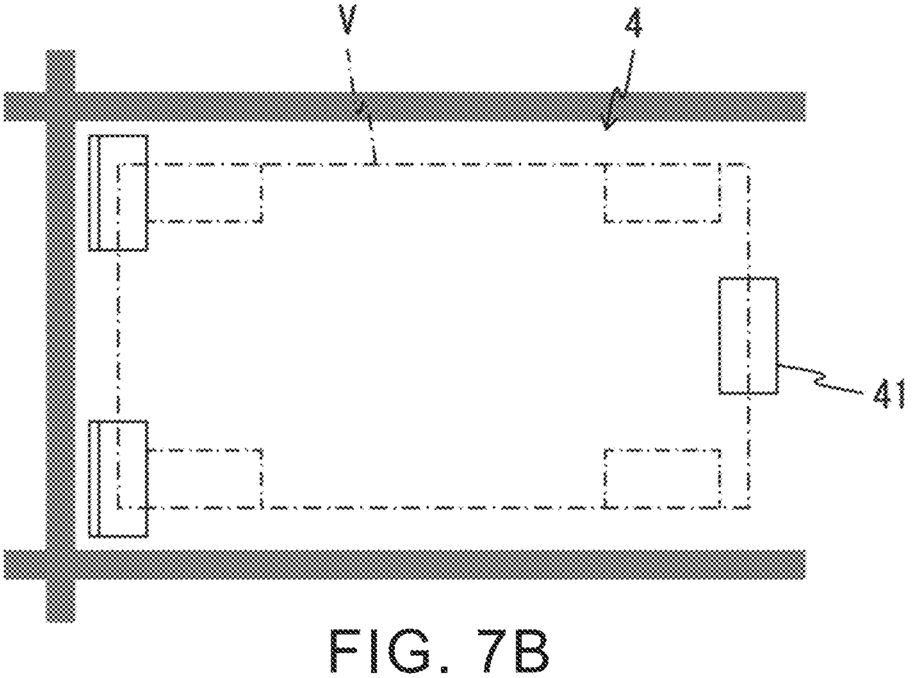
FIG. 7A is a plan view similar to FIG. 6A, and is a diagram showing a state in which the restricting member is in a restricting position.
Figure 7B:
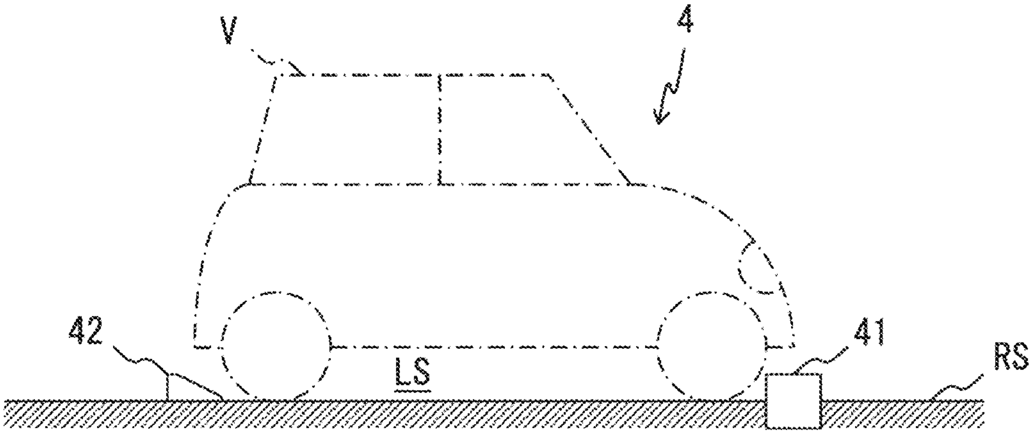
FIG. 7B is a side view similar to FIG. 6B, and is a diagram showing a state in which the restricting member is in the restricting position.
Figure 7C:
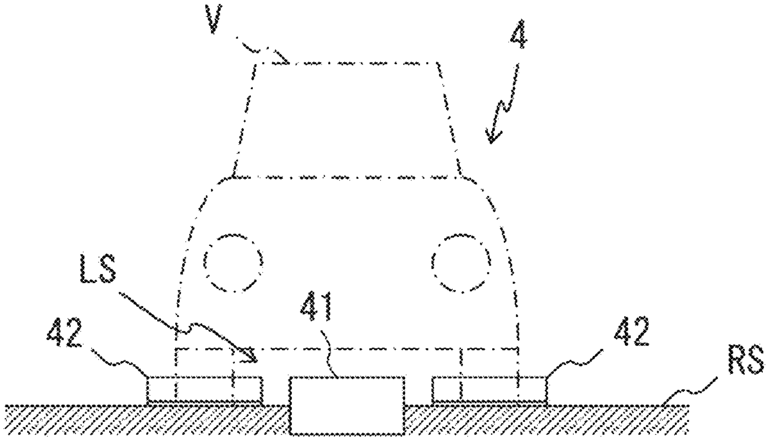
FIG. 7C is a front view similar to FIG. 6C, and is a diagram showing a state in which the restricting member is in the restricting position.

A restricting member 41 having, for example, a rectangular parallelepiped shape is provided in the vicinity of the one end of the parking stall 4 in the longitudinal direction, that is, in a near side area 4F near the passage 5. On the other hand, two parking blocks 42, for example, are provided in the vicinity of the other end of the parking stall 4 in the longitudinal direction, that is, in a far side area 4R far from the passage 5. The restricting member 41 can move in the vertical direction between a restricting position in which the restricting member 41 protrudes from the road surface RS and an allowable position in which the restricting member is retracted to the road surface RS, by an actuator 43. In FIGS. 6A, 6B and 6C, the restricting member 41 is in the allowable position. In FIGS. 7A, 7B and 7C, on the other hand, the restricting member 41 is in the restricting position.

When the vehicle V is to be carried into the parking stall 4 by the transport vehicle 7, the restricting member 41 is positioned in the allowable position. As a result, the transport vehicle 7 can enter the parking stall 4 and drop off the vehicle V.

Then, when carrying the vehicle V into the parking stall 4 is completed, that is, when the transport vehicle 7 leaves the parking stall 4 after dropping off the vehicle V in the parking stall 4, the restricting member 41 is positioned in the restricting position. As a result, entry of the transport vehicle 7 into the parking stall 4 is restricted, and entry of the carrier 7*b* of the transport vehicle 7 into the lower space LS of the vehicle V is restricted. Therefore, the vehicle V in the parking stall 4 is restricted from being unintentionally transported by the transport vehicle 7.

Moreover, as shown in FIGS. 7A and 7C, the width of the restricting member 41 in the embodiment according to the present disclosure is less than the distance between the right and left tires of the vehicle V. Therefore, when the restricting member 41 is in the restricting position, the vehicle V is allowed to enter the parking stall 4 or leave the parking stall 4 by self-propulsion.

When the vehicle V is to be carried out of the parking stall 4 by the transport vehicle 7, the restricting member 41 is positioned in the allowable position. As a result, the transport vehicle 7 can enter the parking stall 4 and pick up the vehicle V.

Then, when carrying the vehicle V out of the parking stall 4 is completed, that is, when the transport vehicle 7 leaves the parking stall 4 after picking up the vehicle V in the parking stall 4, the restricting member 41 is positioned in the restricting position. That is, even when the vehicle V is not parked in the parking stall 4, the restricting member 41 is positioned in the restricting position. As a result, erroneous entry of the transport vehicle 7 into the parking stall 4 is restricted. Also in this case, unintended transportation of the vehicle V is restricted. In another example, the restricting member 41 is held in the allowable position even after carrying the vehicle V out of the parking stall 4 is completed.

Figure 8:
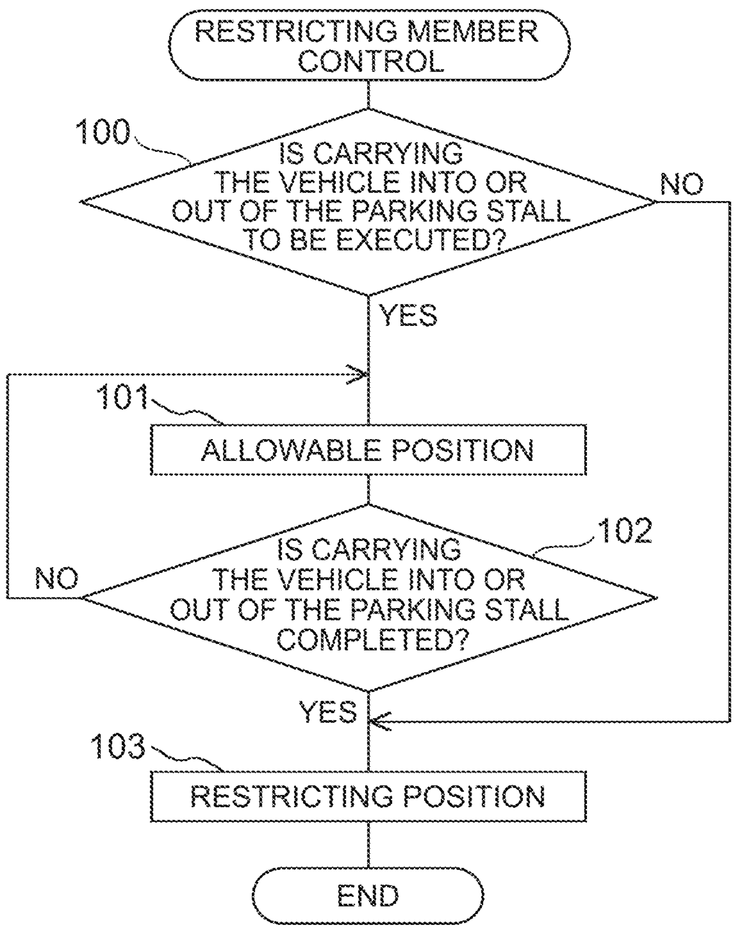
FIG. 8 is a flowchart illustrating a restricting member control routine in the embodiment according to the present disclosure.

FIG. 8 shows a restricting member control routine in the embodiment according to the present disclosure. The routine is executed by the processor 91 of the server 9, for example. With reference to FIG. 8, at step 100, it is determined whether carrying the vehicle V into the parking stall 4 or out of the parking stall 4 is to be executed. When it is determined that carrying the vehicle V into the parking stall 4 or out of the parking stall 4 is to be executed, the process then proceeds to step 101, and the restricting member 41 is controlled to the allowable position. In the subsequent step 102, it is determined whether carrying the vehicle V into the parking stall 4 or out of the parking stall 4 is completed. When it is not determined that carrying the vehicle V into the parking stall 4 or out of the parking stall 4 is completed, the process returns to step 101. When it is determined that carrying the vehicle V into the parking stall 4 or out of the parking stall 4 is completed, the process proceeds to step 103, and the restricting member is controlled to the restricting position. On the other hand, when it is not determined in step 100 that carrying the vehicle V into the parking stall 4 or out of the parking stall 4 is to be executed, the process jumps to step 103.

Figure 9:
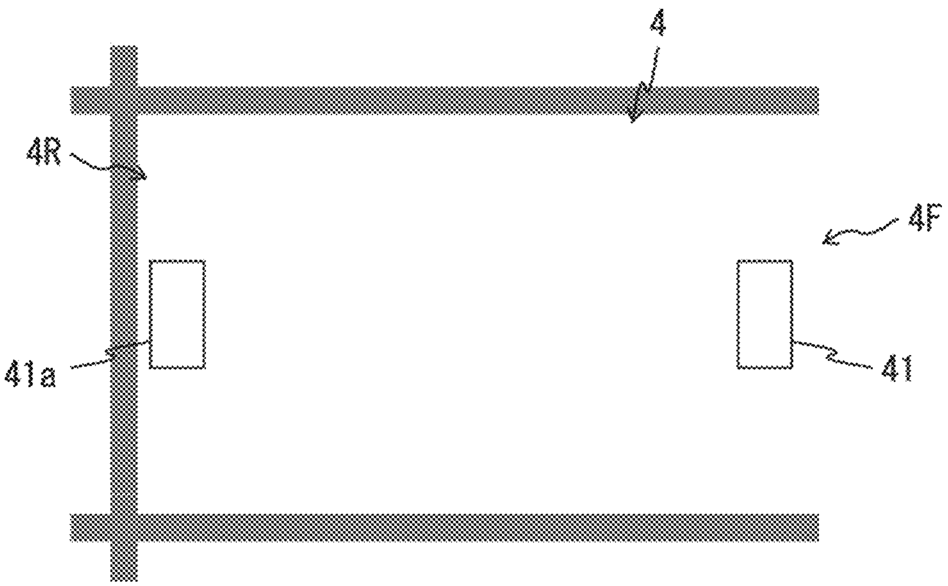
FIG. 9 is a plan view of a parking stall of another embodiment.
Figure 10:
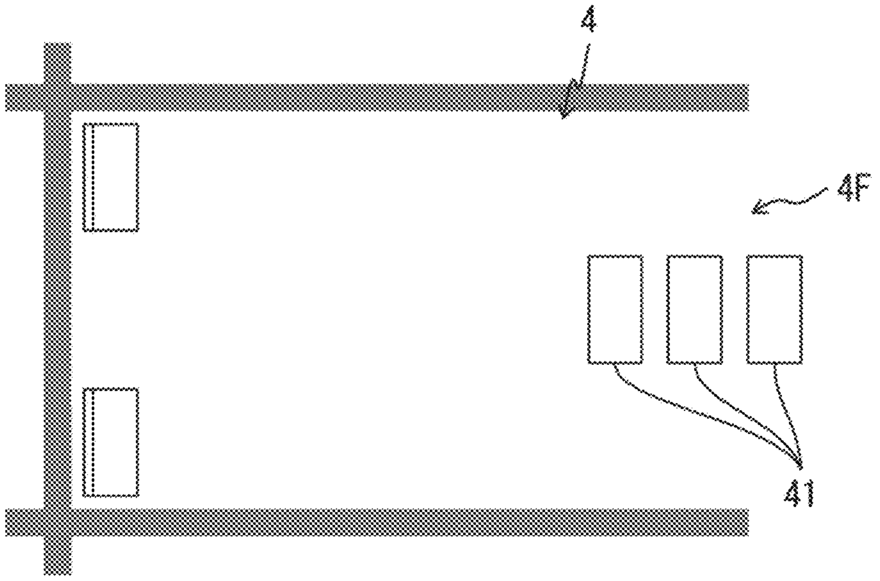
FIG. 10 is a plan view of a parking stall of yet another embodiment.
Figure 11:
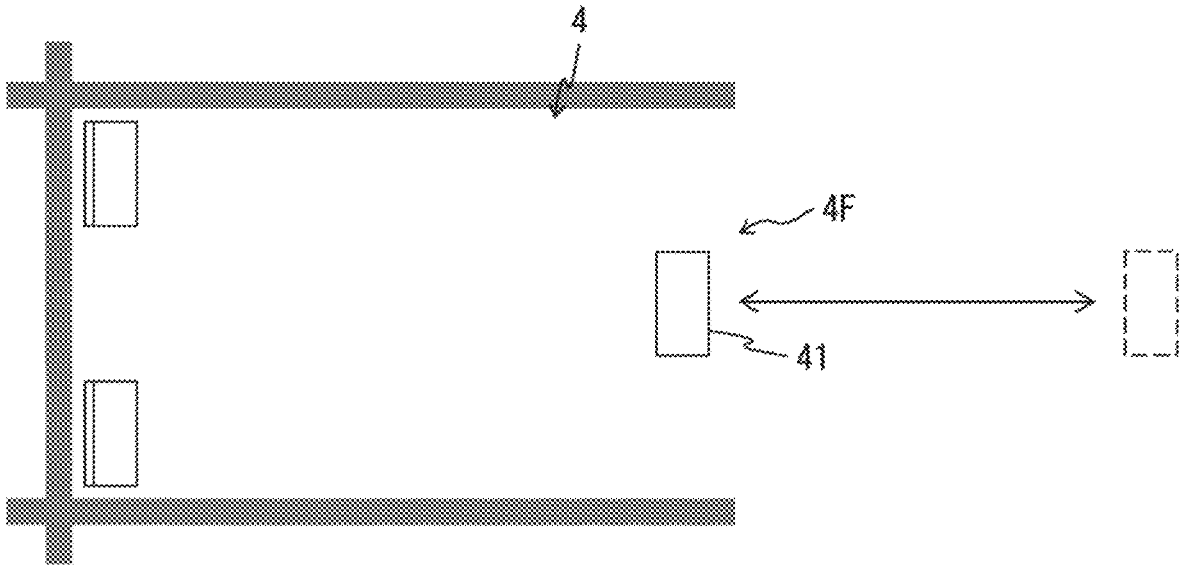
FIG. 11 is a plan view of a parking stall of yet another embodiment.

FIGS. 9, 10 and 11 show other embodiments of the parking stall 4. In an example shown in FIG. 9, the restricting member 41*a* is also provided in the far side area 4R of the parking stall 4. Therefore, in this example, restricting members 41, 41*a* are provided in the vicinity of both ends of the parking stall 4 in the longitudinal direction, respectively. In this way, entry of the transport vehicle 7 into the parking stall 4 is more reliably restricted.

In an example shown in FIG. 10, the restricting member 41 includes a plurality of restricting members 41, and the restricting members 41 are provided so as to be offset from each other in the longitudinal direction of the parking stall 4. In the example shown in FIG. 10, three restricting members 41 are provided. In this way, the position of the protruding restricting member 41 in the longitudinal direction is changed in accordance with the length of the vehicle V in the longitudinal direction.

In an example shown in FIG. 11, the restricting member 41 does not move in the vertical direction, however, the restricting member 41 can move in the horizontal direction between a restricting position indicated by solid lines and an allowable position indicated by dashed lines.

What is claimed is:

1. A parking facility for carrying a vehicle into a parking stall or carrying the vehicle out of the parking stall, the parking facility comprising:
- a transport vehicle configured to enter a lower space under the vehicle and pick up the vehicle; and
- a restricting member configured to move between
  - a restricting position in which entry of the transport vehicle into the parking stall for carrying the vehicle into the parking stall or carrying the vehicle out of the parking stall is restricted, and
  - an allowable position in which the entry of the transport vehicle into the parking stall for carrying the vehicle into the parking stall or carrying the vehicle out of the parking stall is allowed, wherein
- the restricting member in the restricting position is configured to allow the vehicle to move into the parking stall or move out of the parking stall by self-propulsion,
- the restricting member is configured to
  - protrude from a road surface in the restricting position, and
  - retract to the road surface in the allowable position, and
- the restricting member is configured to
  - be controlled by a restricting member control device connected to an input/output interface included in a management server, and
  - be positioned (i) in the restricting position when the vehicle is parked in the parking stall, and (ii) in the allowable position when the transport vehicle carries the vehicle into the parking stall and when the transport vehicle carries the vehicle out of the parking stall.

2. The parking facility according to claim 1, wherein
- the restricting member is positioned in the restricting position when no vehicle is parked in the parking stall.

3. The parking facility according to claim 1, wherein
- the restricting member is provided in a vicinity of one end or both ends of the parking stall in a longitudinal direction of the parking stall.

4. The parking facility according to claim 1, wherein
- the restricting member includes a plurality of restricting members, the plurality of restricting members being provided so as to be offset from each other in a longitudinal direction of the parking stall.

5. The parking facility according to claim 1, wherein the restricting member is close to the vehicle parked in the parking stall in the restricting position, and the restricting member is away from the vehicle parked in the parking stall in the allowable position.

6. The parking facility according to claim 1, wherein the transport vehicle is an autonomous driving vehicle.

7. A parking system for carrying a vehicle into a parking stall or carrying the vehicle out of the parking stall, the parking system comprising:

a transport vehicle configured to enter a lower space under the vehicle and pick up the vehicle;

a restricting member configured to move between a restricting position in which entry of the transport vehicle into the parking stall for carrying the vehicle into the parking stall or carrying the vehicle out of the parking stall is restricted, and an allowable position in which the entry of the transport vehicle into the parking stall for carrying the vehicle into the parking stall or carrying the vehicle out of the parking stall is allowed; and a management server including an input/output interface, and a restricting member control device connected to the input/output interface and configured to control the restricting member, wherein the restricting member control device is configured to control the restricting member to be positioned (i) in the restricting position when the vehicle is parked in the parking stall, and (ii) in the allowable position when the transport vehicle carries the vehicle into the parking stall and when the transport vehicle carries the vehicle out of the parking stall, the restricting member in the restricting position is configured to allow the vehicle to move into the parking stall or move out of the parking stall by self-propulsion, and the restricting member is configured to protrude from a road surface in the restricting position and retract to the road surface in the allowable position.

8. The parking facility according to claim 1, wherein the restricting member has a rectangular parallelepiped shape with a width less than a distance between left and right tires of the vehicle to allow the vehicle to move into the parking stall or move out of the parking stall during both the restricting position and the allowable position of the restricting member.

9. The parking facility according to claim 8, wherein the parking stall has:

an entrance through which the transport vehicle is configured to enter the parking stall, and at which the restricting member is installed, and an end opposite the entrance in a longitudinal direction of the parking stall, the parking facility further comprises a pair of parking blocks installed at the end opposite the entrance at positions corresponding to the left and right tires of the vehicle, and when viewed along the longitudinal direction of the parking stall, the restricting member is completely arranged between the pair of parking blocks.

10. The parking facility according to claim 1, wherein the parking stall has:

an entrance through which the transport vehicle is configured to enter the parking stall, and at which the restricting member is installed, and an end opposite the entrance in a longitudinal direction of the parking stall, the parking facility further comprises a pair of parking blocks installed at the end opposite the entrance at positions corresponding to left and right tires of the vehicle, and when viewed along the longitudinal direction of the parking stall, the restricting member is completely arranged between the pair of parking blocks.

11. The parking system according to claim 7, wherein the restricting member has a rectangular parallelepiped shape with a width less than a distance between left and right tires of the vehicle to allow the vehicle to move into the parking stall or move out of the parking stall during both the restricting position and the allowable position of the restricting member.

12. The parking system according to claim 11, wherein the parking stall has:

an entrance through which the transport vehicle is configured to enter the parking stall, and at which the restricting member is installed, and an end opposite the entrance in a longitudinal direction of the parking stall, the parking facility further comprises a pair of parking blocks installed at the end opposite the entrance at positions corresponding to the left and right tires of the vehicle, and when viewed along the longitudinal direction of the parking stall, the restricting member is completely arranged between the pair of parking blocks.

13. The parking system according to claim 7, wherein the parking stall has:

an entrance through which the transport vehicle is configured to enter the parking stall, and at which the restricting member is installed, and an end opposite the entrance in a longitudinal direction of the parking stall, the parking facility further comprises a pair of parking blocks installed at the end opposite the entrance at positions corresponding to left and right tires of the vehicle, and when viewed along the longitudinal direction of the parking stall, the restricting member is completely arranged between the pair of parking blocks.

* * * * *